United States Patent
Kim et al.

(10) Patent No.: US 9,665,788 B2
(45) Date of Patent: May 30, 2017

(54) METHOD AND APPARATUS FOR SETTING REGION OF INTEREST

(71) Applicant: SAMSUNG SDS CO., LTD., Seoul (KR)

(72) Inventors: Jong Hang Kim, Seoul (KR); Sang Hak Lee, Seoul (KR); Seong Jong Ha, Seoul (KR); Bo Youn Kim, Seoul (KR); Young Min Shin, Seoul (KR); Yu Ri Ahn, Seoul (KR); Yeon Hee Kwon, Seoul (KR); Sun Ah Kang, Seoul (KR)

(73) Assignee: SAMSUNG SDS CO., LTD., Seoul (KR)

(*) Notice: Subject to any disclaimer, the term of this patent is extended or adjusted under 35 U.S.C. 154(b) by 109 days.

(21) Appl. No.: 14/587,577

(22) Filed: Dec. 31, 2014

(65) Prior Publication Data

US 2016/0110623 A1   Apr. 21, 2016

(30) Foreign Application Priority Data

Oct. 20, 2014  (KR) .................. 10-2014-0141856

(51) Int. Cl.
| | |
|---|---|
| *G06K 9/32* | (2006.01) |
| *G06K 9/00* | (2006.01) |
| *G06T 7/20* | (2006.01) |
| *G06T 7/11* | (2017.01) |
| *G06T 7/246* | (2017.01) |
| *G06T 7/194* | (2017.01) |

(52) U.S. Cl.
CPC ....... *G06K 9/3233* (2013.01); *G06K 9/00771* (2013.01); *G06T 7/11* (2017.01); *G06T 7/194* (2017.01); *G06T 7/246* (2017.01); *G06T 2207/10016* (2013.01); *G06T 2207/30232* (2013.01); *G06T 2207/30236* (2013.01); *G06T 2207/30241* (2013.01); *G06T 2207/30256* (2013.01)

(58) Field of Classification Search
CPC .............. G06K 9/3233; G06K 9/00771; G06T 7/0081; G06T 7/2006; G06T 2207/20021; G06T 2207/20144; G06T 2207/30252; G06T 2207/30232; G06T 2207/30236; G06T 2207/30241; G06T 7/2033; G06T 2207/10016; G06T 2207/30256
USPC ........................................... 382/103
See application file for complete search history.

(56) References Cited

U.S. PATENT DOCUMENTS

| | | | |
|---|---|---|---|
| 2009/0141938 A1* | 6/2009 | Lim ................... | G06K 9/00664 382/103 |
| 2014/0003709 A1 | 1/2014 | Ranganathan et al. | |
| 2014/0340513 A1* | 11/2014 | Nagata ..................... | H04N 7/18 348/143 |
| 2015/0016671 A1* | 1/2015 | Adachi .............. | G06K 9/00771 382/103 |

* cited by examiner

*Primary Examiner* — Jon Chang
(74) *Attorney, Agent, or Firm* — Sughrue Mion, PLLC (57) ABSTRACT

According to a first aspect of the present invention, a method for setting a region of interest may include: detecting a mark in an image frame photographed by a camera; and setting a region of interest using the detected mark.

10 Claims, 11 Drawing Sheets

APPARATUS FOR SETTING REGION OF INTEREST (100)

METHOD AND APPARATUS FOR SETTING REGION OF INTEREST

CROSS-REFERENCE TO RELATED APPLICATION

This application claims priority from Korean Patent Application No. 10-2014-0141856 filed on Oct. 20, 2014 in the Korean Intellectual Property Office, and all the benefits accruing therefrom under 35 U.S.C. 119, the contents of which in its entirety are herein incorporated by reference.

TECHNICAL FIELD

The present invention relates to a method and an apparatus for setting a region of interest. More particularly, the present invention relates to a method and an apparatus for setting a region of interest capable of setting a region of interest without an input by a user.

BACKGROUND

A study on a technology of detecting an abnormal behavior based on an image acquired by a camera like a camera monitoring system has been actively conducted.

To detect the abnormal behavior based on the image acquired by the camera, there may often be a need to first set the region of interest in the image acquired by the camera.

The set region of interest may be a region for detecting an abnormal behavior and may also be a region (for example, an invasion line region, a crosswalk region, a road region, a stop line region, a central line region, and the like) which is associated with conditions for detecting the abnormal behavior.

In order to more accurately detect the user's desired abnormal behavior, it is important to accurately set the region of interest. Generally, the region of interest is set relying on an input of the user. Therefore, the regions of interest set depending on user's skills are different and therefore a continuous interest is required.

SUMMARY

The present invention has been made in an effort to provide a method and an apparatus for setting a region of interest capable of setting a region of interest without an input by a user.

The present invention has also been made in an effort to provide a method and an apparatus for setting a region of interest capable of automatically resetting a region of interest when a view point of a camera is changed.

The present invention has also been made in an effort to provide a method and an apparatus for setting a region of interest capable of setting a region of interest to stably detect an abnormal behavior without causing performance deviations due to a user's skill.

Technical problems of the present invention are not limited to the above-mentioned matters and other technical problems which are not mentioned can be clearly understood to those skilled in the art from the following descriptions.

An embodiment of the present invention provides a method for setting a region of interest including: detecting a mark in an image frame photographed by a camera; and setting a region of interest using the detected mark.

Another embodiment of the present invention provides a method for setting a region of interest including: detecting a change in a view point of a camera; detecting a mark in an image frame photographed by the camera when the change in the view point is detected; and setting the region of interest using the detected mark.

Yet another embodiment of the present invention provides an apparatus for setting a region of interest including: a mark detection unit configured to detect a mark in an image frame photographed by a camera; and a region of interest setting unit configured to set the region of interest using the detected mark.

Still another embodiment of the present invention provides an apparatus for setting a region of interest including: a view point change detection unit configured to detect a change in a view point of a camera; a mark detection unit configured to detect a mark in an image frame photographed by the camera when the change in the view point is detected; and a region of interest setting unit configured to set the region of interest using the detected mark.

As described above, according to the exemplary aspects of the present invention, it is possible to set the region of interest without the input by the user.

According to the exemplary aspects of the present invention, it is possible to automatically reset the region of interest when the view point of the camera is changed.

According to the exemplary aspects of the present invention, it is possible to set the region of interest to stably detect the abnormal behavior without causing performance deviations due to the user's skill.

Effects of the present invention are not limited to the above-mentioned effects and other effects which are not mentioned can be clearly understood to those skilled in the art from the following descriptions.

BRIEF DESCRIPTION OF THE DRAWINGS

The above and other features and advantages of the present invention will become more apparent by describing in detail embodiments thereof with reference to the attached drawings in which.

DETAILED DESCRIPTION OF THE EMBODIMENTS

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Hereinafter, a method for setting a region of interest according to an embodiment of the present invention will be described with reference to FIGS. 1 to 10. The present embodiments may be performed by a computing apparatus including a computing unit. For example, the computing apparatus may be an apparatus for setting a region of interest according to another embodiment of the present invention. A configuration and an operation of the apparatus for setting a region of interest may be understood based on contents described with reference to FIGS. 11 and 14.

Figure 1:
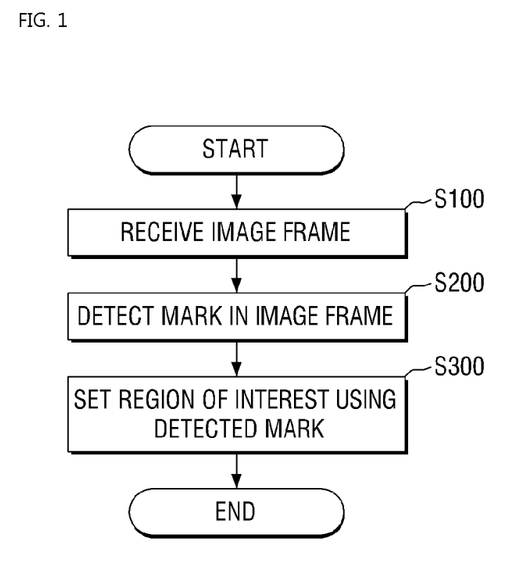
FIG. 1 is a flow chart illustrating a method for setting a region of interest according to an embodiment of the present invention.

FIG. 1 is a flow chart illustrating a method for setting a region of interest according to an embodiment of the present invention.

Referring to FIG. 1, the apparatus for setting a region of interest receives an image frame from a camera (S100).

The apparatus for setting a region of interest may receive the image frame from the camera through wired communication and/or wireless communication (S100).

For example, the apparatus for setting a region of interest may receive the image frame from the camera in real time for every moment the image frame is photographed, receive the image frame for a specific time, receive the image frame for specific data amount, and periodically receive the image frame.

The apparatus for setting a region of interest may detect a mark in the image frame (S200).

The apparatus for setting a region of interest receives a plurality of image frames from the camera and the apparatus for setting a region of interest may detect marks in each image frame.

The mark may be an object which corresponds to a preset object among still objects which are present in the image frame.

In detail, the mark may be a meaningful object which is associated with an abnormal behavior sensed by a user, among the still objects which are present in the image frame.

The apparatus for setting a region of interest may set the region of interest using the detected mark (S300).

More detailed example will be described with reference to FIG. 2.

Figure 2:
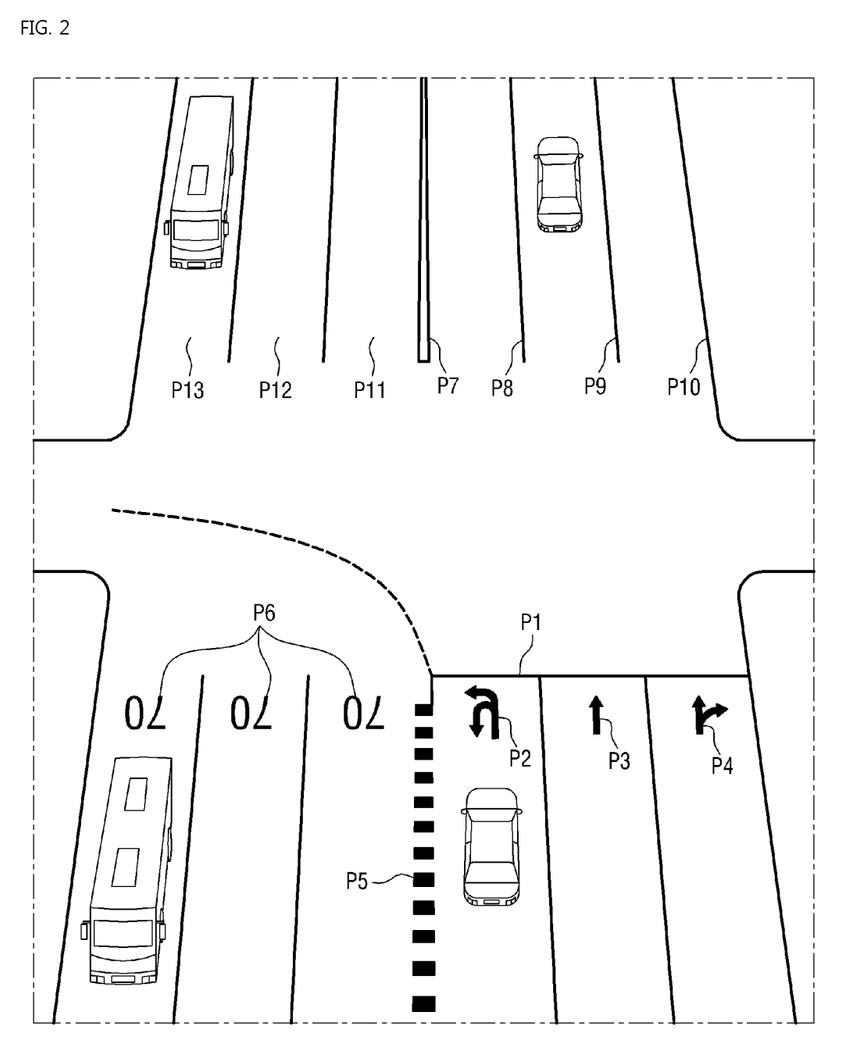
FIG. 2 is a diagram illustrating an example of a mark detected in an image frame when a camera photographs a road condition.

FIG. 2 is a diagram illustrating an example of the mark detected in the image frame when the camera photographs a road condition.

FIG. 2 illustrates the case in which the camera photographs a road condition, in which the abnormal behavior in the road condition may be, for example, a stop line violation, a traffic signal violation, an illegal U-turn, a speed violation, a center line violation, and the like.

Therefore, a meaningful object which is associated with the abnormal behavior to be detected may be a stop line P1, driving direction display regions P2, P3, and P4, a U-turn possible region P5, a speed limit display region P6, a center line P7, lanes P8, P9, and P10, roads P11, P12, and P13, and the like.

Trees, buildings, and the like which are not associated with the abnormal behavior to be detected may not be reckoned as a mark. However, when the abnormal behavior to be detected by the user is associated with trees or buildings, the trees or the buildings may also be reckoned as a mark.

The mark illustrated in FIG. 2 is only an example of a mark in the road condition. If necessary, more marks may be present in FIG. 2. Therefore, the mark may be preset according to the need of the user and may also be changed. That is, as illustrated in FIG. 2, the mark which is preset as a mark to be detected in the image frame received from the camera which photographs the road condition may be the stop line P1, the driving direction display regions P2, P3, and P4, the U-turn possible region P5, the speed limit display region P6, the center line P7, the lanes P8, P9, and P10, and the roads P11, P12, and P13.

Figure 3:
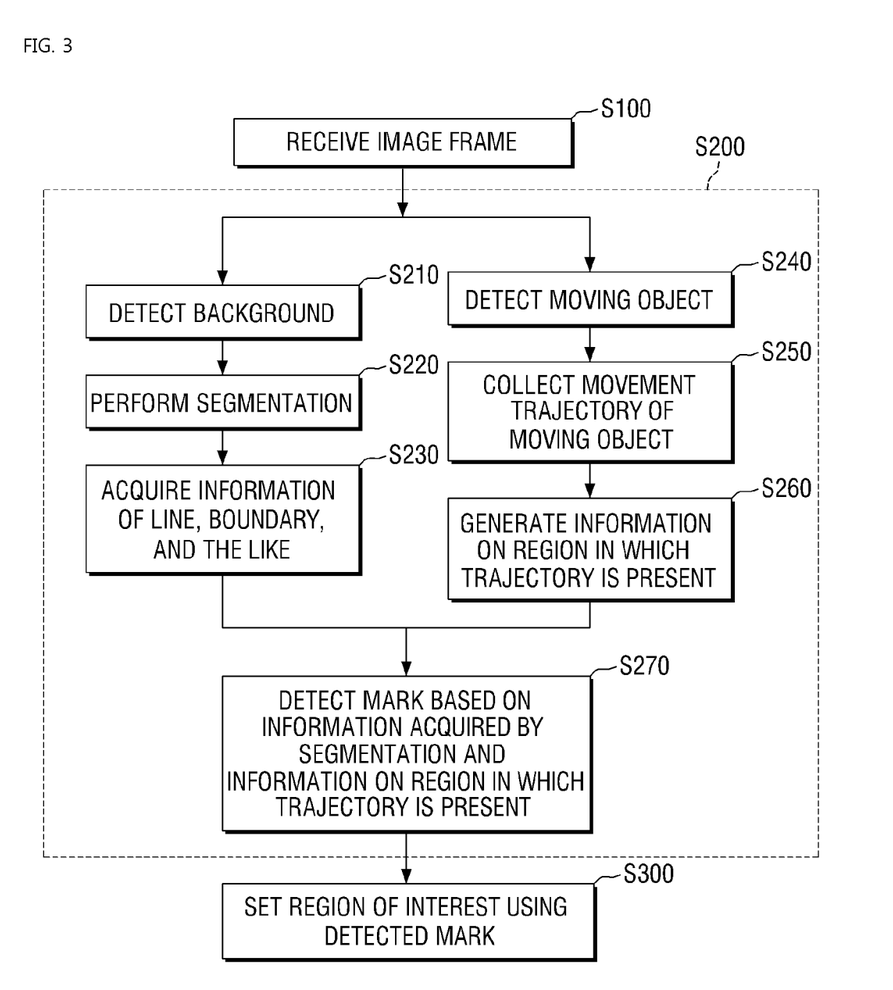
FIG. 3 is a flow chart for describing a detailed example of detecting the mark.

FIG. 3 is a flow chart for describing a detailed example of detecting the mark.

Referring to FIG. 3, the apparatus for setting a region of interest may perform steps S210 to S270 to detect the mark.

In detail, the apparatus for setting a region of interest may detect a background including the still object in the received image frame (S210).

A method for detecting a background may use various known technologies.

The still object is included in the background. Therefore, the background may include a mark.

The apparatus for setting a region of interest segments the detected background (S220).

The apparatus for setting a region of interest may acquire segmentation information which is information including a line, a boundary, and the like from the image frame which suffers from the segmentation process (S230).

The apparatus for setting a region of interest may determine whether the information included in the segmentation information corresponds to the mark based on the movement trajectory of the object.

The apparatus for setting a region of interest detects a moving object in the image frame (S240).

The apparatus for setting a region of interest collects the movement trajectory of the detected moving object (S250).

The apparatus for setting a region of interest generates information on the region in which the trajectories are present based on the collected movement trajectories (S260).

The apparatus for setting a region of interest may detect the mark using the segmentation information and the information on the region in which the movement trajectories are present (S270).

In detail, describing as an example the road condition illustrated in FIG. 2, the apparatus for setting a region of interest may more accurately detect the marks regarding the U-turn possible region, the center line, the lane, the road, and the like by referring to the region in which movement trajectories of vehicles which are moving objects are present.

However, all the marks are not detected by the information on the region in which the movement trajectories are present.

The speed limit display region, the driving direction display region, and the like may be detected as the mark only by the detected segmentation information without the information on the region in which the movement trajectories are present.

For example the apparatus for setting a region of interest may detect a form of a specific region based on the line and boundary information and match the detected form of the specific region with the preset mark to detect a mark corresponding to the detected form.

The apparatus for setting a region of interest may also detect the mark only by the region in which the movement trajectories are present. For example, in the case of the center line in the road condition, even though the segmentation information is not present, the center line may be determined as a mark by detecting the region corresponding to the center line.

However, to more accurately determine the region and kind of marks, the segmentation information and the information on the region in which the movement trajectories are present may be comprehensively used.

Figure 4:
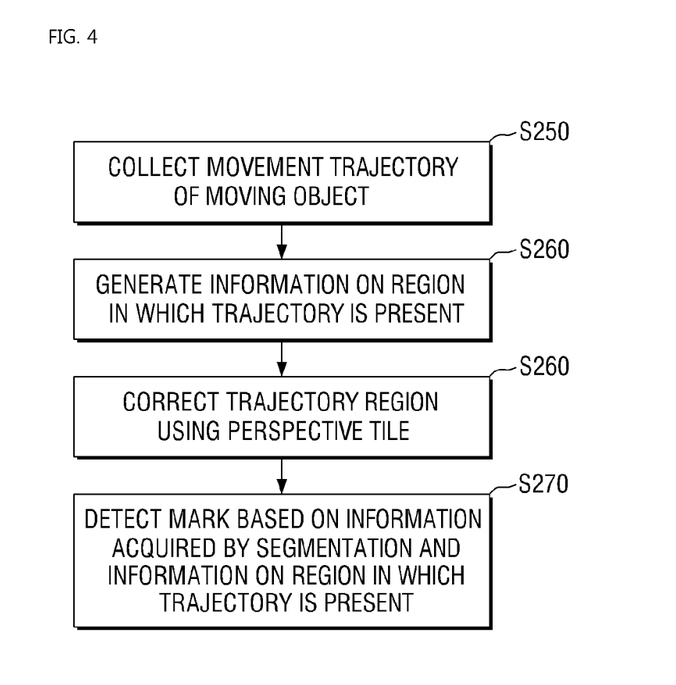
FIG. 4 is a flow chart illustrating an example of a method for correcting a region in which movement trajectories are present.

FIG. 4 is a flow chart illustrating an example of a method for correcting a region in which movement trajectories are present.

Referring to FIG. 4, the apparatus for setting a region of interest corrects the information on the region in which the movement trajectories are present.

In detail, the apparatus for setting a region of interest may correct a difference in the number of pixels corresponding to the physically same region which occurs due to a distance between the moving object and the camera.

A volume occupied by physically the same region is the same in the same object. However, the number of pixels which are occupied by physically the same region may be different in the image frame due to a difference, and the like depending on a perspective or a view point of the camera which are generated at the time of the camera photographing.

To correct this, a perspective tile may be used.

Figure 5:
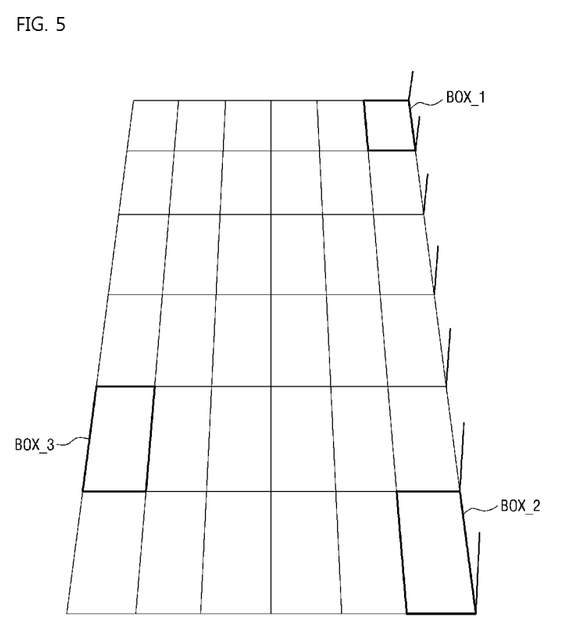
FIG. 5 is a diagram illustrating an example of a perspective tile.

FIG. 5 is a diagram illustrating an example of the perspective tile.

Physical information at each tile is the same. That is, each tile has a width, a length, and a height which are substantially physically the same. For example, one tile may have physical information of 1.5 m in width, 1.5 m in length, and 1.5 m in height.

That is, in FIG. 5, Box_1, Box_2, and Box_3 are physically all 1.5 m in width, length, and height in reality.

A problem which is caused due to the difference, and the like, depending on the perspective and the view point of the camera which is generated at the time of the camera photographing may be solved by using the perspective tile as illustrated in FIG. 5.

The apparatus for setting a region of interest may acquire a variety of physical information such as an actual size, a moving speed, and the like, of the object which moves in the frame by using the perspective tile. In detail, the perspective tile has information on the physical size, and the like and may calculate the size, the moving speed, and the like of the moving object when knowing a photographing speed of the camera (for example, photographs 30 frames per 1 second, and the like) per hour.

In more detail, the prospective tile may be acquired by using a calibration of the camera. The reason is that photographing timing, and the like of each camera may be different.

The calibration of the camera means obtaining coordinates, a tilt angle, and a rotation angle, a pan angle of the camera, or the like to calculate at which position and in which direction the camera is installed. The above problem may be solved based on parameters of the camera which are obtained depending on an execution result of the calibration. In addition, it is possible to obtain an effect of parameter tuning by applying different parameters to each section of the prospective tile which is acquired depending on the coordinates, the tilt angle, the rotation angle, the pan angle of the camera, or the like.

The calibration of the camera may be used to remove the inaccurate movement trajectory among the collected movement trajectories.

Figure 6:
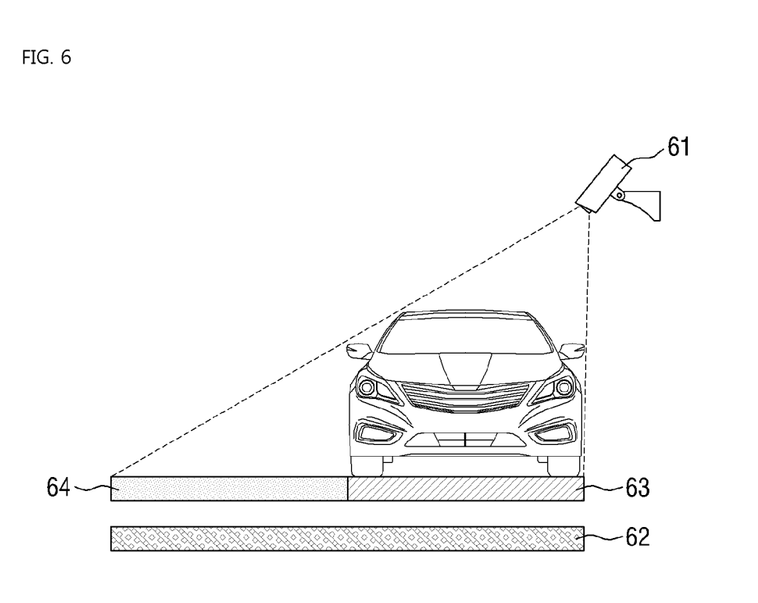
FIG. 6 is a diagram for describing the presence and removal a necessity of an inaccurate movement trajectory among collected movement trajectories.

FIG. 6 is a diagram for describing the presence and removal of a necessity of the inaccurate movement trajectory among the collected movement trajectories.

Referring to FIG. 6, when a camera 61 which is positioned at an upper right end on a road photographs a vehicle, it may be appreciated that the inaccurate movement trajectory 64 may be generated due to an installation position of the camera 61, a photographing direction of the camera 61, a photographing timing of the camera 61, a height of the vehicle, and the like.

That is, an accurate movement trajectory 63 of a vehicle and a movement trajectory 62 including the inaccurate movement trajectory 64 become a movement trajectory used to generate a region in which the movement trajectories are present.

Therefore, the apparatus for setting a region of interest may remove the inaccurate movement trajectory 64 using the perspective tile and the parameters which are generated by the calibration of the camera 61 to generate the information on the region in which the more accurate movement trajectories are present.

Figure 7:
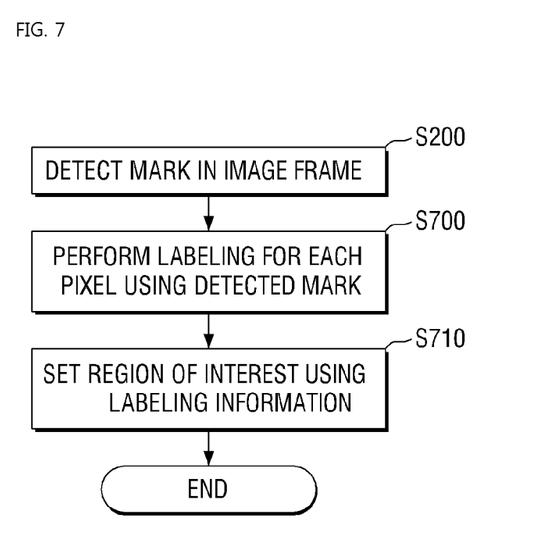
FIG. 7 is a flow chart illustrating the method for setting a region of interest according to the embodiment of the present invention to which a labeling process is added.

FIG. 7 is a flow chart illustrating the method for setting a region of interest according to the embodiment of the present invention to which a labeling process is added.

Referring to FIG. 7, the apparatus for setting a region of interest may use the detected mark to perform the labeling for each pixel.

Each pixel may be labeled for each kind of marks which are detected in the corresponding pixel (S700). Therefore, one pixel may match one piece of labeling information and one pixel may also match a plurality of pieces of labeling information. Further, any pixel may not also be matched with any labeling information.

Figure 8:
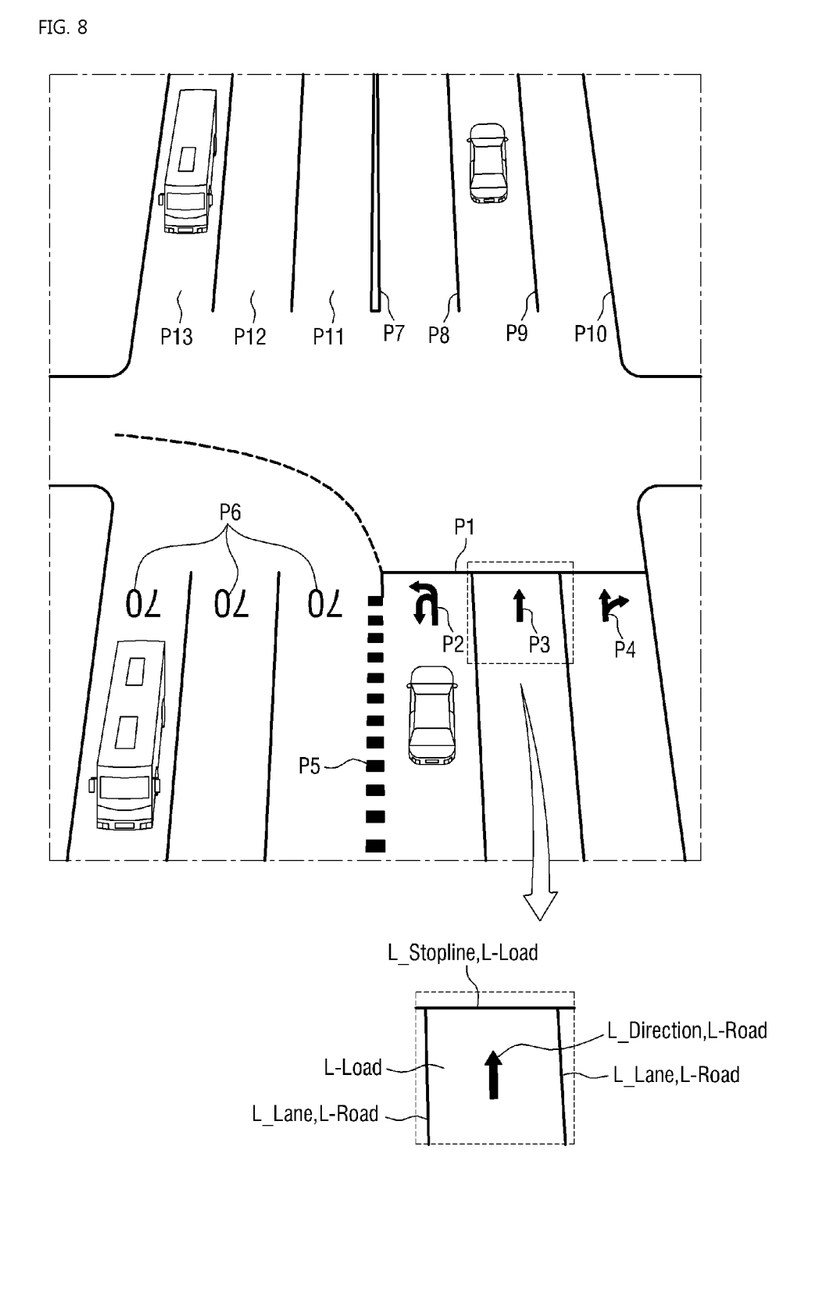
FIG. 8 is a diagram for describing an example of performing the labeling for each pixel.

FIG. 8 is a diagram for describing an example of performing the labeling for each pixel.

An example in which a box portion represented by a dotted line in FIG. 8 is enlarged and the labeling for each pixel is performed on the enlarged portion will be described with reference to FIG. 8.

Each pixel corresponding to the center line may be labeled by a label corresponding to the center line. For example, each pixel corresponding to the center line may be labeled by L_StopLine.

Each pixel corresponding to the driving direction display region may be labeled by a label corresponding to the driving direction display region. For example, each pixel corresponding to the driving direction display region may be labeled by L_Direction.

Each pixel corresponding to the lane may be labeled by a label corresponding to the lane. For example, each pixel corresponding to the lane may be labeled by L_lane.

Alternatively, the lane may also be differently labeled depending on an order of whether the lane is a first lane from the central line, the lane is a second lane from the central line, and the like.

Next, all the pixels configuring a dotted line box in FIG. 8 correspond to a road. Therefore, all the pixels inside the dotted line box each may be labeled by L_Road which is a label corresponding to the road.

Therefore, each pixel corresponding to the center line, each pixel corresponding to the driving direction display region, and each pixel corresponding to the lane have two pieces of labeling information.

Referring again to FIG. 7, the apparatus for setting a region of interest may use the labeling information to set the region of interest (S710).

For example, assuming that a user or a system using the present invention is for monitoring an abnormal behavior of a stop line violation, a stop line region may be previously designated to be set as the region of interest.

When the apparatus for setting a region of interest intends to set the stop line region as the region of interest as previously designated, a set of the pixels including the labeling information corresponding to the stop line region may be set as the region of interest.

That is, the method for setting a region of interest according to the embodiment of the present invention may set a set of the pixels including the labeling information corresponding to the corresponding mark as the region of interest when the mark associated with the abnormal behavior is set as the region of interest to detect the abnormal behavior.

Even when the region of interest to be set is changed by changing the abnormal behavior to be detected, the region of interest may be easily changed or reset using the labeling information.

Figure 9:
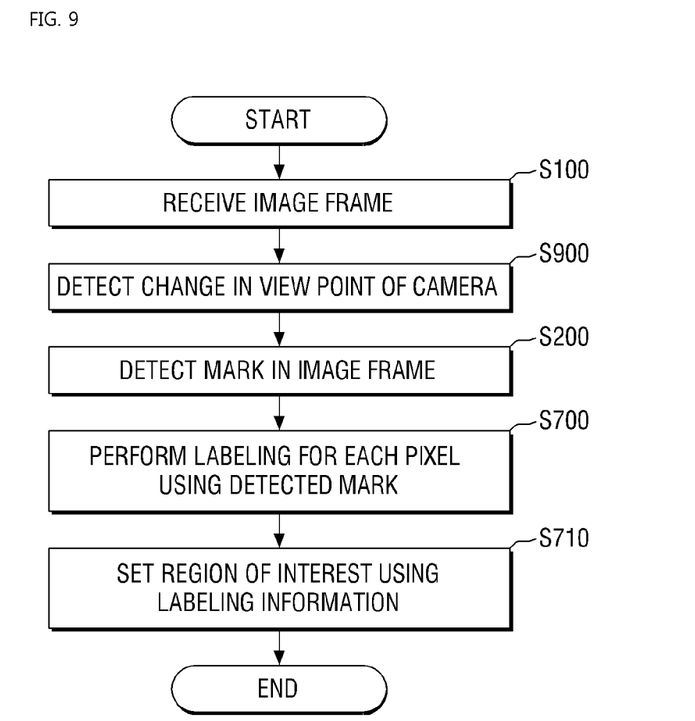
FIG. 9 is a flow chart illustrating another application example of the method for setting a region of interest according to the embodiment of the present invention.

FIG. 9 is a flow chart illustrating another application example of the method for setting a region of interest according to the embodiment of the present invention.

Referring to FIG. 9, the method for setting a region of interest according to the embodiment of the present invention may detect whether the view point of the camera is changed (S900) using the image frame received from the camera.

The method for setting a region of interest according to the embodiment of the present invention re-detects the mark and resets the region of interest when the view point of the camera is changed.

When the view point of the camera is changed due to pan, tilt, and zoom, the existing detected mark information has an error, and therefore the region of interest may be inaccurately set and the abnormal behavior may be detected.

Therefore, the method for setting a region of interest may re-detect the mark depending on the contents described with reference to FIGS. 1 to 8 and reset the region of interest when the photographing timing of the camera is changed.

Figure 10:
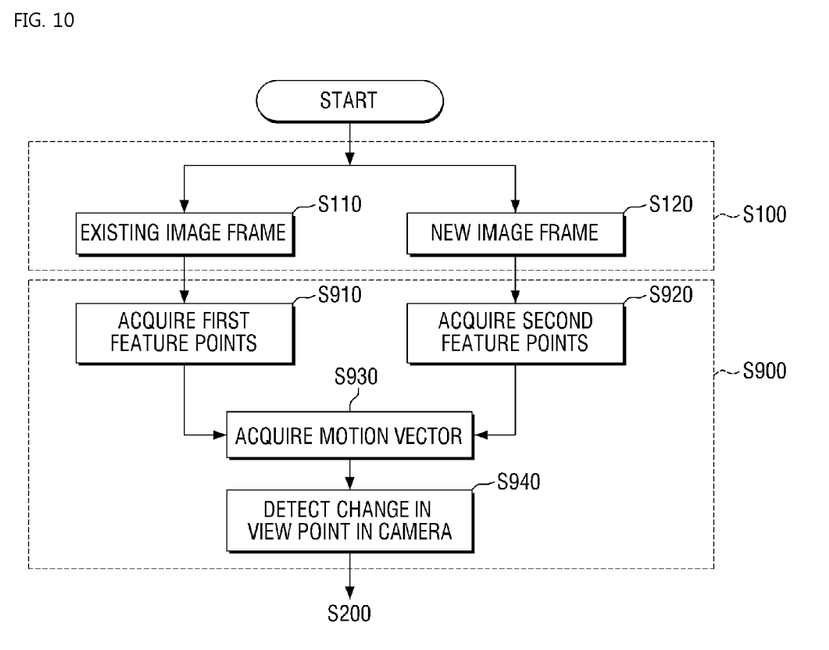
FIG. 10 is a flow chart for describing an example of a method for detecting that the view point of the camera is changed.

FIG. 10 is a flow chart for describing an example of a method for detecting that the view point of the camera is changed.

As described above, the method for setting a region of interest may be performed by various computing apparatuses. For example, the computing apparatus is the apparatus for setting a region of interest.

Referring to FIG. 10, the apparatus for setting a region of interest acquires feature points from the existing image frame (S110 and S910). The feature points acquired from the existing image frame are referred to as first feature points.

The apparatus for setting a region of interest acquires feature points from a new image frame (S120 and S920). The feature points acquired from the new image frame are referred to as second feature points.

The existing image frame is a frame photographed followed by photographing the new image frame temporally. The existing image frame and the new image frame both may be the image frames which are photographed by the same camera.

The first feature points and the second feature points which are acquired by the apparatus for setting a region of interest may be feature points of the preset objects.

The preset object is a still object. Referring to FIG. 2, for example, the preset object may be the lane, the central line, and the like. In addition, the preset object may be various still objects such as a streetlight and a sign of a building. However, a twig, and the like which may move by the wind may not be the preset object.

The preset object is preferably included in the photographed image frame at all times even when the preset object is photographed while changing the view point of the camera.

Next, referring to FIG. 10, the apparatus for setting a region of interest may acquire a motion vector using the first feature points and the second feature points (S930).

The apparatus for setting a region of interest may use the motion vector to detect whether the photographing timing of the camera is changed (S940).

For example, the apparatus for setting a region of interest may determine that the photographing timing of the camera is changed when the acquired motion vector is equal to or more than a preset size.

The method for setting a region of interest according to the embodiment of the present invention automatically re-detects the mark and resets the region of interest whenever the photographing timing of the camera is changed, thereby accurately and effectively setting the region of interest without requiring continuous management by the user.

Figure 11:
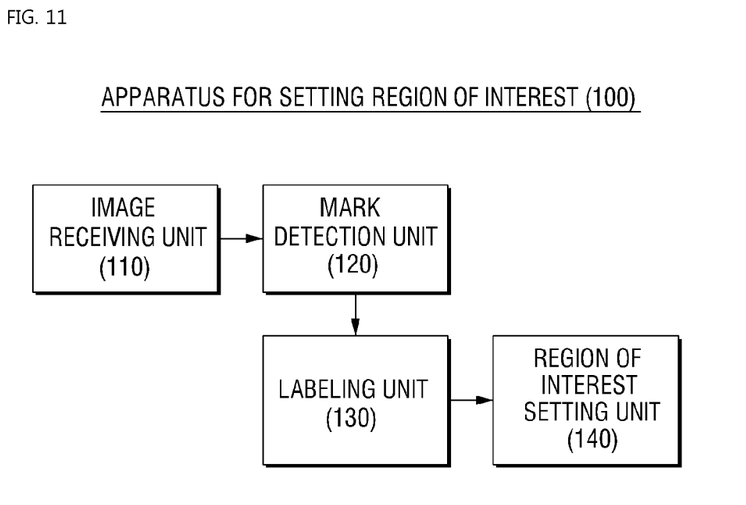
FIG. 11 is a block diagram illustrating an apparatus for setting a region of interest according to another embodiment of the present invention.

FIG. 11 is a block diagram illustrating an apparatus for setting a region of interest according to another embodiment of the present invention.

Contents regarding the method for setting a region of interest according to the embodiment of the present invention described with reference to FIGS. 1 to 10 may be applied to an apparatus 100 for setting a region of interest according to another embodiment of the present invention.

Referring to FIG. 11, the apparatus 100 for setting a region of interest according to another embodiment of the present invention may include an image receiving unit 110, a mark detection unit 120, a labeling unit 130, and a region of interest setting unit 140.

The image receiving unit 110 may receive image frames photographed by the camera.

The mark detection unit 120 may detect marks in the image frame.

The labeling unit 130 performs the labeling for each kind of marks. The labeling unit 130 may perform the labeling for each pixel.

The region of interest setting unit 140 may use the labeled information to set the region of interest.

Figure 12:
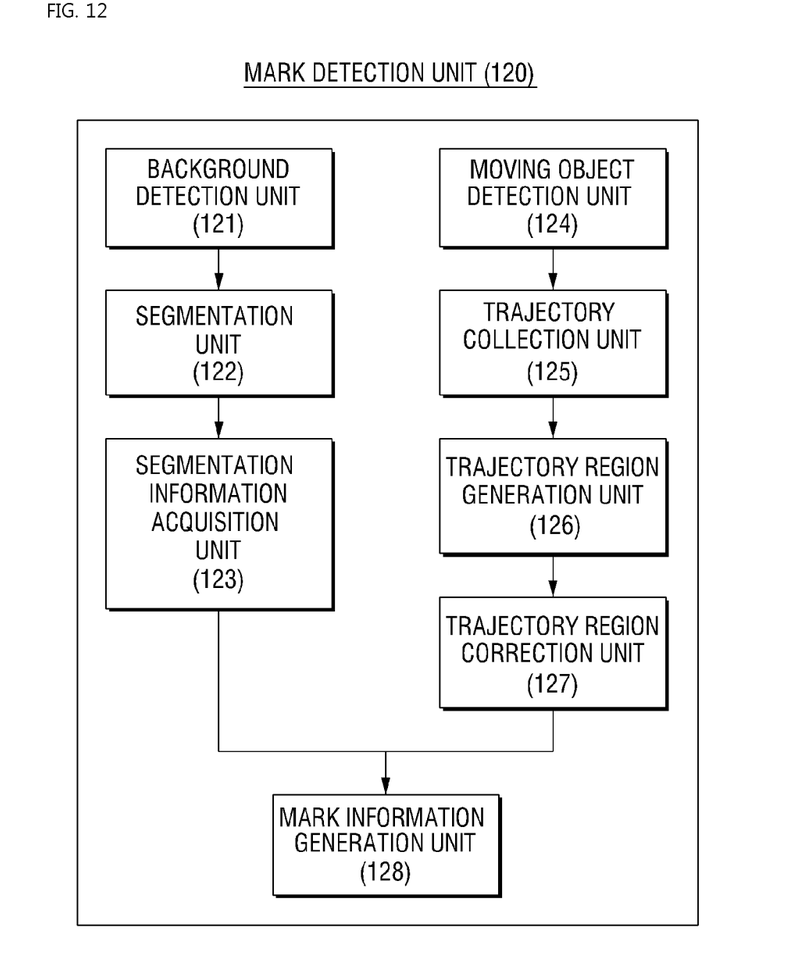
FIG. 12 is a block diagram illustrating a mark detection unit of the apparatus for setting a region of interest according to another embodiment of the present invention.

FIG. 12 is a block diagram illustrating the mark detection unit of the apparatus for setting a region of interest according to another embodiment of the present invention.

Describing an example of a detailed configuration of the mark detection unit 120 with reference to FIG. 12, the mark detection unit 120 may include a background detection unit 121, a segmentation unit 122, a segmentation information acquisition unit 123, a movement object detection unit 124, a trajectory collection unit 125, a trajectory region generation unit 126, a trajectory region correction unit 127, and a mark information generation unit 128.

The background detection unit 121 may detect a background including the still object in the image frame.

The segmentation unit 122 may segment the detected background.

The segmentation information acquisition unit 123 may acquire various information including the line and the boundary in the image frame which suffers from the segmentation process.

The movement object detection unit 124 may detect a moving object in the image frame.

The trajectory collection unit 125 may collect the movement trajectory of the detected moving object.

The trajectory region generation unit 126 may use the movement trajectory of the collected moving object to generate the information on the region in which the movement trajectories are present.

The trajectory region correction unit 127 may perform the correction to remove the inaccurate region among the regions in which the generated movement trajectories are present and correct the error which occurs due to the view point of the camera to generate the information on the region in which the more accurate movement trajectories are present.

The mark information generation unit may use the information on the region in which the information acquired by the segmentation information acquisition unit 123 and/or the movement trajectories generated from the trajectory region correction unit 127 are present to detect the mark and generate the information on the mark, such as the information on the kind of marks.

Figure 13:
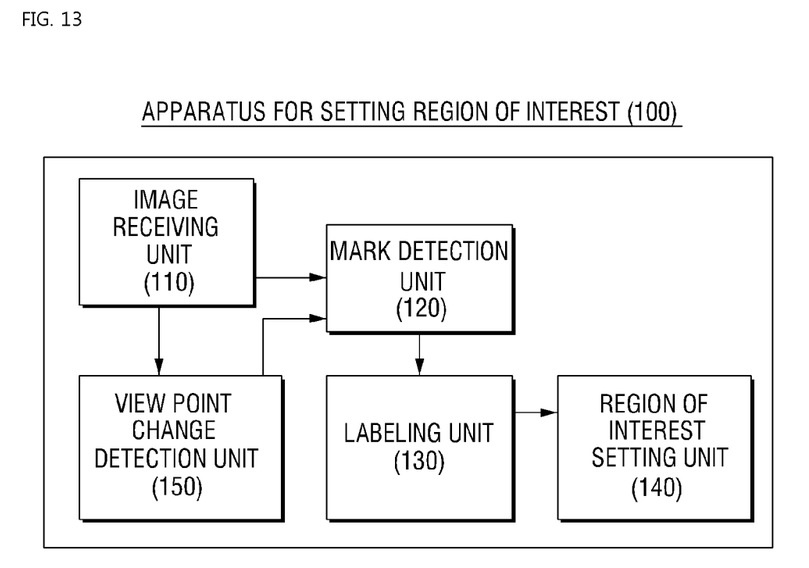
FIG. 13 is another block diagram illustrating an apparatus for setting a region of interest according to another embodiment of the present invention.

FIG. 13 is another block diagram illustrating an apparatus for setting a region of interest according to another embodiment of the present invention.

Referring to FIG. 13, the apparatus 100 for setting a region of interest may further include a view point change detection unit in addition to the components illustrated in FIG. 11.

The view point change detection unit may detect whether the photographing timing of the camera is changed.

When the photographing timing of the camera is changed by the view point change detection unit, the mark detection unit 120 may re-detect the mark in the image frame photographed by the camera of which the photographing timing is changed.

The labeling unit 130 may re-perform the labeling for each pixel depending on the re-detected mark.

The region of interest setting unit 140 may use the re-performed labeling information to reset the region of interest.

Figure 14:
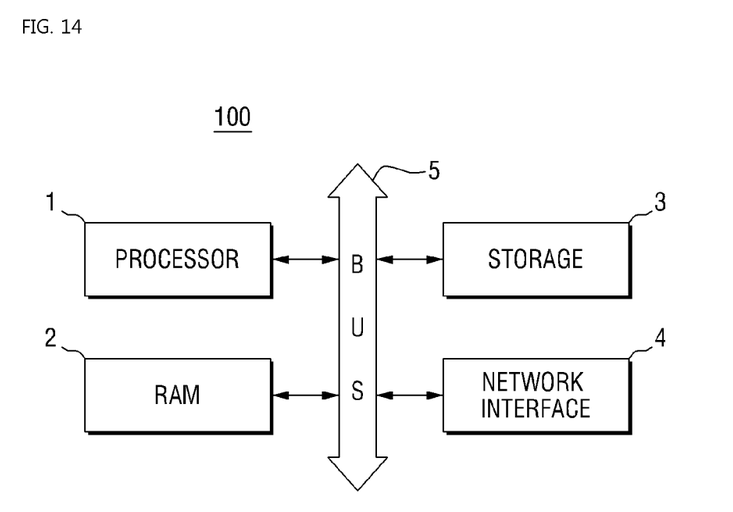
FIG. 14 is another configuration diagram of the apparatus for setting a region of interest.

FIG. 14 is another configuration diagram of the apparatus 100 for setting a region of interest.

The apparatus 100 for setting a region of interest may also have the configuration illustrated in FIG. 14. The apparatus 100 for setting a region of interest may include a processor 1 executing a command language, a memory 2, a storage 3 in which region of interest setting program data are stored, a network interface 4 for transmitting and receiving data to and from external apparatuses, and a data bus 5.

The data bus 5 is connected to the processor 1, the memory 2, the storage 3, and the network interface 4 and thus may be a data moving path.

The storage 3 may store the region of interest setting program data. The region of interest setting program data may include a process of detecting the change in the view point of the camera, a process of detecting the mark in the image frame photographed by the camera when the change in the view point is detected, and a process of setting the region of interest using the detected mark.

Hereinabove, the method for setting a region of interest according to the embodiments of the present invention described with reference to FIGS. 1 to 10 may be performed by running a computer program which is implemented by a code which may be stored on a computer readable medium and may be read by a computer. An example of the computer readable medium may include mobile recording media (CD, DVD, Blu-ray disk, USB storage, mobile hard disk) or fixed recording media (ROM, RAM, hard disk embedded in computer). The computer program recorded in the computer readable recording medium is transmitted from a first computing apparatus to a second computing apparatus through a network such as the Internet and thus may be installed in the second computing apparatus, such that the computer program may be used in the second computing apparatus. The first computing apparatus and the second computing apparatus include a server apparatus, a fixed computing apparatus such as a desk top PC, a mobile computing apparatus such as a notebook, a smart phone, and a tablet PC, and a wearable computing apparatus such as a smart watch and smart glasses.

The apparatus and method for setting a region of interest according to the embodiment of the present invention may set the region of interest without the input by the user.

The apparatus and method for setting a region of interest according to the embodiment of the present invention may automatically reset the region of interest when the view point of the camera is changed.

The apparatus and method for setting a region of interest according to the embodiments of the present invention may set the region of interest to stably detect the abnormal behavior without causing performance deviations due to the user's skill.

Hereinabove, each component of FIGS. 11, 12, and 13 may mean software or hardware such as a field-programmable gate array (FPGA) and an application-specific integrated circuit. However, the components are not limited to the software or the hardware, but may be configured to be in the storage medium which may be addressed and may also be configured to run one or more processors. Functions provided in the components may be implemented by more subdivided components and may also be implemented by a single component configured by integrating a plurality of components to perform a specific function.

The foregoing is illustrative of the present invention and is not to be construed as limiting thereof. Although a few embodiments of the present invention have been described, those skilled in the art will readily appreciate that many modifications are possible in the embodiments without materially departing from the novel teachings and advantages of the present invention. Accordingly, all such modifications are intended to be included within the scope of the present invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The present invention is defined by the following claims, with equivalents of the claims to be included therein.

What is claimed is:

1. A method for setting a region of interest, the method comprising:
    detecting a mark in an image frame photographed by a camera;
    performing labeling for each pixel present in the image frame depending on a kind of the detected mark to generate labeling information; and
    setting a region of interest using the detected mark,
    wherein in the setting the region of interest, the region of interest is set using the labeling information.

2. The method of claim 1, wherein the detecting the mark comprises:
    detecting a background in the image frame;
    performing a segmentation process to segment the detected background;
    acquiring segmentation information including a line and a boundary in the image frame; and
    detecting the mark using the acquired segmentation information.

3. The method of claim 1, wherein the detecting the mark comprises:
    detecting a moving object in the image frame;
    collecting a movement trajectory of the detected moving object;
    generating information on a region in which the collected movement trajectory is present based on the collected movement trajectory; and
    detecting the mark using the generated information.

4. The method of claim 3, wherein the generating the information on the region in which the movement trajectory is present comprises correcting a difference in the number of pixels corresponding to physically the same region, the difference occurring due to a distance between the moving object and the camera.

5. The method of claim 1, wherein the mark is an object corresponding to a preset object among still objects which are present in the image frame.

6. A method for setting a region of interest, the method comprising:
    detecting a change in a view point of a camera;
    detecting a mark in an image frame photographed by the camera when the change in the view point is detected; and
    setting a region of interest using the detected mark,
    wherein the detecting the change in the view point of the camera comprises:
    acquiring first feature points which are feature points of a first image frame, among a plurality of image frames;

acquiring second feature points which are feature points of a second image frame photographed after the first image frame is photographed, among the plurality of image frames;

acquiring a motion vector using the acquired first feature points and the acquired second feature points; and detecting the change in the view point of the camera using the acquired motion vector.

7. The method of claim 6, wherein the first feature points and the second feature points are feature points of preset objects.

8. The method of claim 6, further comprising:

performing labeling for each pixel present in the image frame depending on a kind of the detected mark to generate labeling information, wherein in the setting of the region of interest, the region of interest is set using the labeling information.

9. An apparatus for setting a region of interest, the apparatus comprising:

a mark detector configured to detect a mark in an image frame photographed by a camera;

a labeling processor configured to perform labeling for each pixel present in the image frame depending on a kind of the detected mark to generate labeling information; and a region of interest processor configured to set the region of interest using the detected mark, wherein the region of interest processor uses the labeling information to set the region of interest.

10. The apparatus of claim 9, wherein the mark detector comprises:

a movement object detector configured to detect a moving object in the image frame;

a trajectory determination processor configured to determine a movement trajectory of the detected moving object;

a trajectory region generator configured to generate information on a region in which the determined movement trajectory is present based on the determined movement trajectory; and a mark information generator configured to detect the mark using the generated information.

* * * * *